United States Patent Office 3,360,820
Patented Jan. 2, 1968

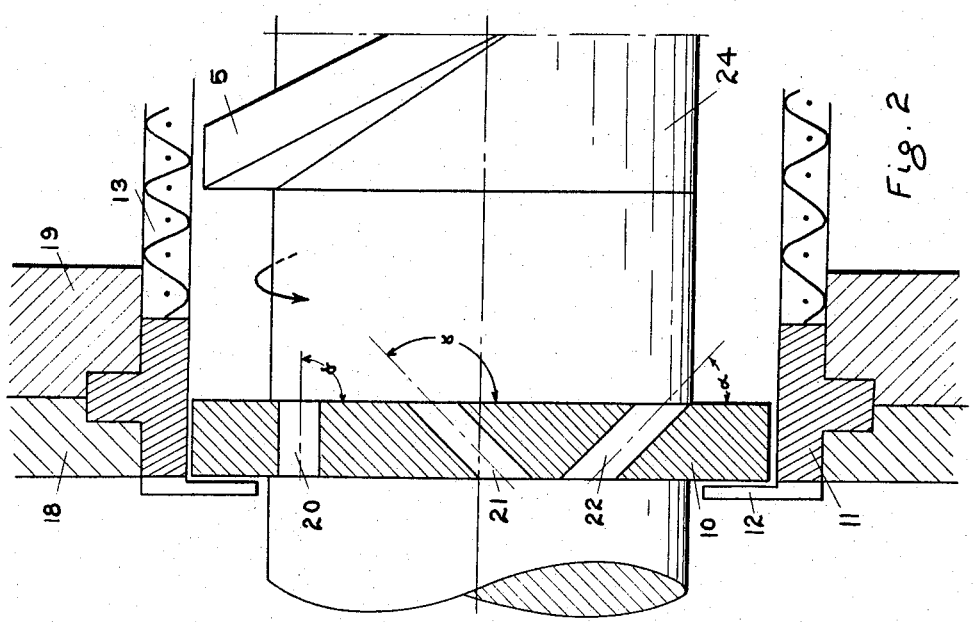
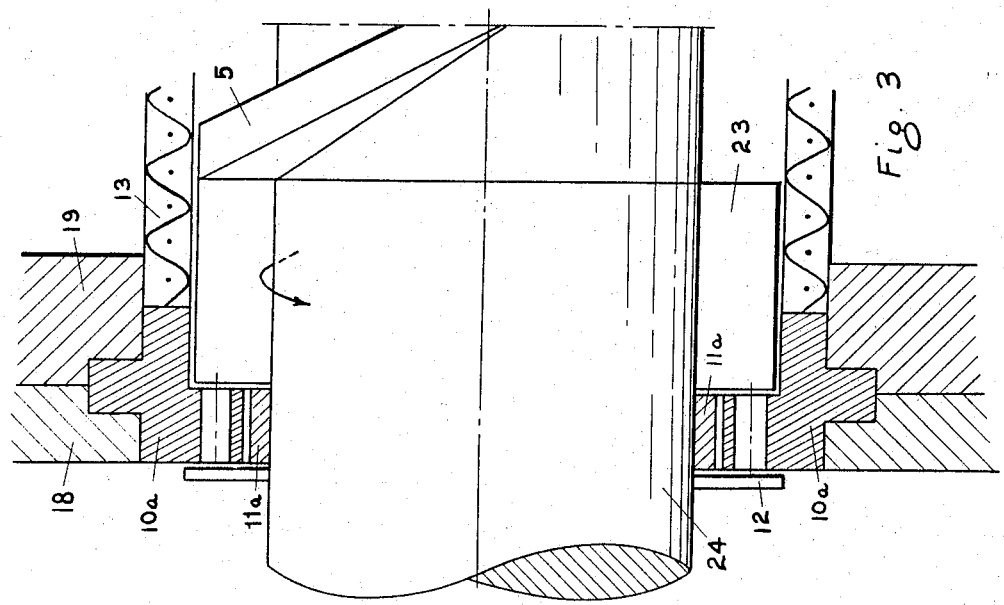

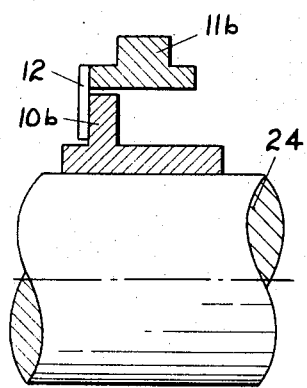
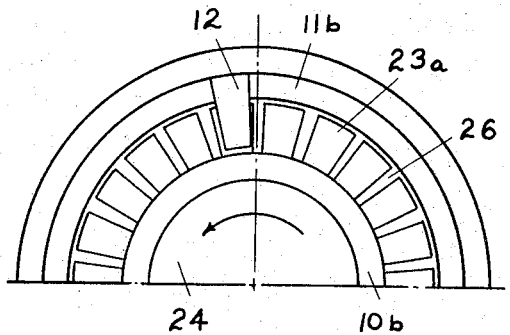
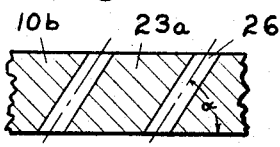
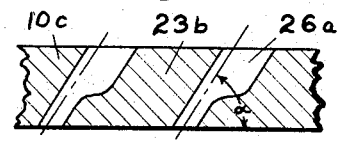
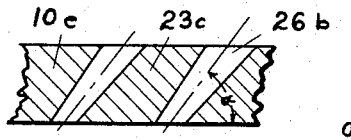
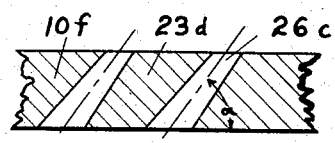

3,360,820
PROCESS AND APPARATUS FOR WORKING AND DISINTEGRATING SYNTHETIC RUBBER
Hubertus Zitzmann, Marl, Paul Bernemann, Haltern, Wilhelm Schänzer and Hans Westermann, Marl, Germany, assignors to Chemische Werke Huls Aktiengesellschaft, Kreis Recklinghausen, Germany, a corporation of Germany
Filed Jan. 31, 1964, Ser. No. 341,545
Claims priority, application Germany, Feb. 19, 1963, C 29,193; Oct. 12, 1963, C 31,125
10 Claims. (Cl. 18—12)

It is well known that synthetic rubber, when produced by polymerization, is obtained either as a latex, an emulsion of minute particles in water, or as a solution in a neutral solvent from which it must be precipitated and separated as solid phase. The bulk of the liquid phase first is separated mechanically, for example by a vibration strainer, a centrifuge, a filter or a worm press until the remaining moisture amounts to 5–50% relative to the wet product. The residual liquid is finally removed in a thermal dryer, for example a heating furnace or a drying extruder.

A worm press frequently is employed for the initial extraction of water from synthetic rubber where the residual moisture ranges from 5 to 15%. The high pressure of 300 atmospheres and above which is present during this operation is generated by a sharp constriction of the flow of the product delivered by the worm. Constricting or damming means, employed for this purpose, are first: a so-called tapered head, i.e., opposed cones, in certain instances provided with grooves, i.e., a so-called serrated head, and secondly a perforated disk, that is a disk which is arranged concentrically of the shaft or the housing and which closes off the interior of the press from the discharge area. The perforated disk is provided with a number of bores of specific sizes. The worm shaft either ends at, or protrudes through the perforated disk, depending on the specific design of the worm press. The axial velocity within a worm press pulsates longitudinally because the worm threads which cause the advancement do not permit any movement in th axial direction. This results in a continuous periodical fluctuation of the discharge and has a detrimental effect on the operation of the equipment following the press. In order to compensate for the variations in the discharge the worm threads terminate at a distance of one or two turns from the discharge device. Within this area of the apparatus the non-uniform axial velocities will equalize quickly due to the internal tangential stresses created by the high viscosities or plasticities respectively. The rubber mass also will very quickly match the circumferential velocity of the outer cylinder with the result that the rubber mass will strike the bore edges of the perforated disk almost vertically so that the diameter of the extruded rubber will be substantially equal to the diameter of the bores. The rubber strands which extrude in compact form from the perforated disk are cut into pieces of specific length by a cutting device arranged near the perforated disk and usually consisting of one or more knives arranged at, and rotating with the shaft. If a tapered head is employed as the damming means the rubber which is forced through the head will be shredded into more or less thick strips or strands.

Experience has shown that rubber which has been initially dehydrated and extruded at such viscosity is unsuitable for final drying by thermal means. For this reason it becomes necessary to provide a grinding operation in order to obtain a loose product. However, such operation is costly, equipment-wise as well as energy-wise, and results in the production of a substantial amount of very fine particles which will stick to the walls of the dryer thereby increasing dust accumulation, requiring frequent cleaning and servicing.

The structure of the rubber obtained after its extrusion from the worm press is subject particularly to the internal adhesive forces. These are the forces which detemine the shape of the non-vulcanized rubber when it becomes fractured after being subjected to stresses exceeding its breaking point. Its shape due to fracture can be stringy, crumbly, lardy or blunt. The internal adhesive forces depend first on the type of the monomers employed, for example butadiene or isoprene in case of homopolymers, or their mixture with compounds such as acrylonitrile or styrene in case of co-polymers, and secondly on the emulsifying and diluting agent employed, on the stereoisomerization of the polymerization product, and on the type of the side links, cross linkings and gel formations. At the present time known methods such as the plasticity test to determine the Mooney- or Defo-factor, the ultraviolet and ultrared spectrum analysis and the gel test can not be utilized to ascertain the strength of the internal adhesive forces. The only method feasible is the qualitative visual inspection after application of appropriate mechanical stresses.

It has been found that the energy needed to force the rubber through a perforated disk or a tapered head requires a substantial portion of the total energy output, in many instances 50% or more. Consequently, the quantity of flow through a worm press, its carrying capacity being limited for reasons of durability, is reduced substantially. The energy expended to force the rubber through the device is not lost from a thermodynamic point of view because it is transformed into heat, thereby raising the temperature of the rubber but is more costly than other energies which can be employed for the heating of the dryer, such as steam or combustion gas. Since the grinding operation also requires a substantial expenditure of energy, the saving of energy expenditure is necessary for reasons of economy.

It has been found that it becomes possible to work plastically and to disintegrate synthetic rubber in a worm press which is provided with a perforated disk at its discharge end at a substantially reduced expenditure of energy if the rubber mass is conveyed by the rotation of the worm to a perforated disk which performs a relative motion with respect to the rubber mass within a plane extending perpendicularly to the longitudinal axis of the worm shaft. As a result the longitudinal bore axes will carry out a relative motion perpendicularly to the direction of conveyance of the rubber, their speed, relative to the outermost circle or bores in the perforated disk, matching at least the mean conveyance speed of the rubber mass but commonly being greater than the conveyance speed by approximately a power of ten. Due to this arrangement the rubber will not strike the bores perpendicularly but at an angle $\beta$, its tangent being formed by the vectors of the negative relative speed of the outermost bores and the positive mean conveyance speed of the rubber. The rubber is not simply forced through the bores of the perforated disk but is chipped or torn off by the running edges of the bores. This occurrence can be compared with the shaping by cutting in case of metals: feed—in case of the rubber its mean axial conveyance speed; cutting speed—the mean relative peripheral speed of the bores; and the cutting angle $\alpha$—in case of the present arrangement the position of the bores. In particular if the value of the angle $\alpha$ approaches the value of angle $\beta$, a shaving or cutting effect is attained at the passage through the perforated disk, and in the opposite case a tearing effect will occur. In this manner it becomes feasible to transform very viscous rubber into a porous structure by tearing, and rubber with a strong tendency to crumble into coherent masses, without the formation of small pieces, by a shaving operation.

The invention will be described more in detail hereinafter in connection with the accompanying drawings in which:

FIG. 2 is an enlarged sectional view of the discharge end of the press shown in FIG. 1, particularly showing the angles of the bores in the perforated disk;

FIG. 3 is an enlarged sectional view, similar to FIG. 2 of the discharge end of a modified form of screw press;

FIG. 4 is a fragmentary longitudinal sectional view of another form of perforated disk;

FIG. 5 is a fragmentary plan view of the perforated disk shown in FIG. 4;

FIGS. 6–9 are fragmentary sections of perforated disks showing different types of bores;

Figure 1:
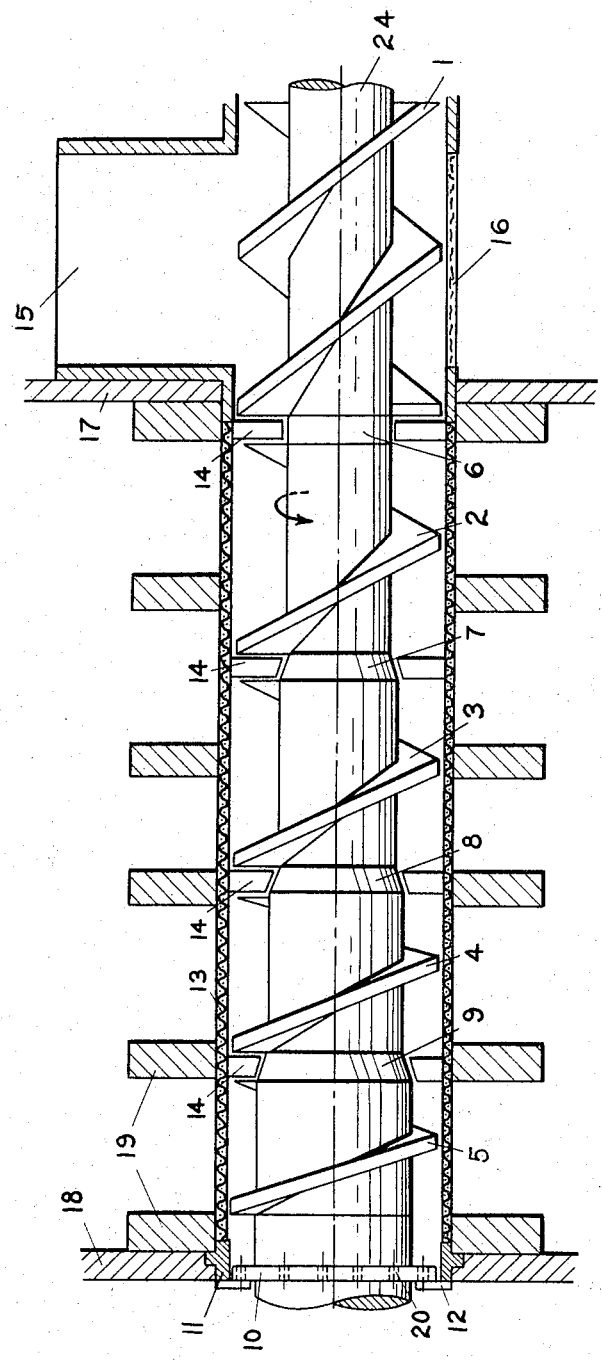
FIG. 1 is a longitudinal axial sectional view, partly in elevation, of one form of worm press in accordance with the invention.
Figure 10:
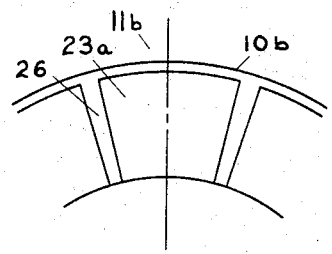
FIGS. 10–13 are fragmentary plan views of the perforated disk showing different types of bores.
Figure 11:
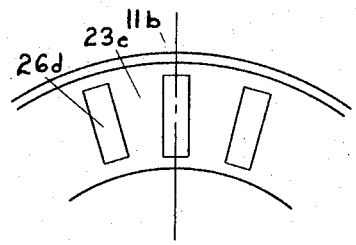

Any worm press which will permit the dehydration of synthetic rubber is suitable for the proposed process. The process can be carried out with particularly advantageous results if a worm press is employed where a perforated disk is arranged fixedly relative to the worm shaft at an angle of 90° with respect to the longitudinal axis of the shaft at the discharge end of the press. This preferred species is illustrated in FIGURES 1 and 2. On the worm shaft 24 there are arranged the intake worm 1, the compression worms 2 to 5 and the spacers 6 to 9. At the end of the shaft (discharge end) is located the perforated disk 10 which runs with very little clearance within the counter ring 11 which supports the knives 12. The shaft is surrounded by a strainer 13 which is provided with small apertures for the discharge of the fluid. Opposite to the spacers 6 to 9 there are located within the housing the scrapers 14 which prevent the product from rotating with the shaft. The product enters through the filler neck 15 with a filter 16 arranged at its bottom for the outflow of the draining liquid. The filler neck 15 is screwed to the base 17 of the worm press. The strainer 13 is reinforced by the frame 19 and fastened thereby to the bases 17 and 18. The product introduced through the filler neck 15 is picked up by the worm 1 and conveyed through the apparatus to the discharge end by the worms 2 to 5. Due to the back pressure created by the perforated disk 10 and the compression by the worms 1 to 5 the rubber is compressed continuously and the water is forced out and discharged through the apertures in the strainer 13. The rubber leaving the terminal pressure worm 5 looses immediately—as explained previously—its peripheral component of velocity and will flow almost axially toward the perforated disk 10 which rotates together with the shaft 24. Since the bores of the perforated disk move relative to the rubber they have a cutting and shearing effect on the rubber. The angle $\alpha$, for example of bores 20, 21 and 22, can be varied from 20° to 160° as shown by FIGURE 2. It is also feasible to arrange in the disk 10 several concentric circles of bores. By proper selection of angles it is possible to attain a variety of cutting and shearing effects, from a cutting off to a tearing off. The strands of rubber, emerging from the bores of the perforated disk 10 with a very loosened structure are cut into pieces by the knives 12 and fall into the thermal dryer (not shown) arranged in succession to the press. The structure of the product is so loose that grinding is unnecessary. Furthermore, the product has a very low content of finely powdered material with the result that the service life of the dryers is improved greatly. Another advantageous species of the worm press is illustrated in FIG. 3. This design differs from the arrangement illustrated by FIGURES 1 and 2 only in that a stationary perforated disk 10$a$ is employed, while the counter ring 11$a$ being integral with the rotating shaft. The knives 12 are carried by the counter ring 11$a$. Between the pressure worm 5 and the perforated disk 10$a$ vanes 23 are arranged to keep the product in relative motion with the shaft until it reaches the stationary perforated disk 10$a$. The vanes 23 can also be designed in the form of a terminal worm. In order to avoid any pulsation it is advantageous to keep between the final pressure worm 5 and the vanes 23 an interval of ½ to 2 times the pitch of the pressure worm. Preferably, the vanes 23 are designed in the form of webs of a double- or triple-threaded worm with an endless pitch, that is they are arranged axially parallel. The peripheral velocity which is given to the rubber by means of these vanes, thereby generating the relative motion required for the cutting action, can be varied further by different angles of the bores in the disk 10$a$, for example in the manner illustrated by FIGURE 2.

The bore of the perforated disk 10$a$ can form an angle ranging from 20° to 160° C., preferably 45 to 135°, with the longitudinal axis of the worm shaft, depending on the characteristics of the rubber to be processed, in particular its ability to loosen up. The diameter of these bores ranges from ⅕ to ¹⁄₅₀ of the diameter of the perforated disk. The number of the bores in the perforated disk depends on the quantity of flow and the pressure build-up as needed for the desired degree of water removal.

It was found that in case of some rubber species, for example certain types of cold rubber produced in emulsion of styrene-butadiene copolymers, the shaving edges of the bores in the perforated disk will produce rubber bands of non-uniform thickness, at the edge approximately 1 mm. and in the center up to 5 mm. Since the drying time required by the thermal dryers arranged following the worm press depends to a large degree on the thickness of the rubber bands, such bands will take up to three hours for the drying process.

In further development of the above described arrangement it was also found that it becomes possible to limit the thickness of the rubber bands to approximately 1 to 2 mm. and thus to reduce the required drying time to approximately 45 to 60 minutes if the bores of the perforated disk are designed in the form of narrow radial slots with a width ranging from .5 to 15 mm., preferably 1 to 5 mm., and a length of ¼ to ¹⁄₂₀ of the outer diameter of the perforated disk being shaped as a pressure ring or disk, preferably 70 to 100% of the depth of the terminal worm thread. The profile of the slots can—in accordance with a specific species of the proposed process—either decrease in direction of the flow of products to 20 to 90%, preferably 50 to 70%, of the area of the side profile, or increase to 110 to 300%, preferably 150 to 200%. Finally, the profile of the slots can vary continuously in radial direction, that is it can increase as well as decrease in one direction.

The above described arrangement is explained in detail on the basis of FIGURES 4 to 14. FIGURES 4 and 5 show the basic design of the perforated disk, FIGURES 6 to 9 show species—viewed in direction of the flow products—and FIGURES 10 to 13 show other species—viewed vertically to the direction of product flow. It should be understood that the design of the slot shape represents in all instances a combination of one of the potentialities depicted in FIGURES 6 to 9 with one of the potentialities depicted in FIGURES 10 to 13.

Referring to FIG. 4 the perforated disk 10$b$ is fixedly connected to and rotates with the shaft 24 within the counter ring 11$b$. The knives 12, which are fastened to the side of the counter ring 11$b$ facing away from the product, cut the rubber, emerging from the aperture 26 in the disk 10$b$—FIGURE 5—into pieces of a specific length. The areas of the disk 10b located between the slots 26 are designated as vanes 23a. The slots have a width ranging from .5 to 15 mm., preferably 1 to 5 mm. and a length amounting to ¼ to ½₀ of the outer diameter of the perforated disk 10b arranged in back of the worm, preferably 70 to 100% of the depth of the terminal worm thread. The outer diameter of the perforated disk 10b preferably equals the outer diameter of the terminal worm thread. The depth is a function of the so-called compression ratio of the worm and varies usually between 5 and 15% of the outer diameter of the shaft. The center lines of the slots 26—see FIGURES 6 to 9—form with the face of the disk 10b the angle α which varies from 20° to 160° C., preferably from 45° to 135° C. If this angle α is decreased, the shaving effect of the rear edge of the slot—viewed in direction of motion—will increase. The slots 26, their arrangement depicted by FIGURE 5, can be designed in various manner as shown by, but not limited to FIGURES 6 to 13.

The most simple arrangement is shown by FIGURE 6, a slot of uniform width as shown in FIG. 5. In case of this design the vane 23a, located between the slots 26 is placed under stress in peripheral direction by the pressure building up at the pressure disk and released within the slot. The principal advantage of this design is the fact that it can be manufactured at relatively low cost. In order to lower the pressure at the vanes 23a, exerted by the rubber in peripheral direction, the slots can expand in direction of the product flow either discontinuously or continuously as shown by the slots 26a and 26b of FIGURES 7 and 8. FIGURE 9 shows a design where the slot 26c becomes narrower in direction of the production flow. Due to the variable frictional forces generated between wall and rubber it becomes possible to influence the macrostructure of the rubber in a manner which will facilitate its drying.

If the slots are arranged in radial direction there are two designs possible: the open (FIGURES 10 and 12) and the closed (FIGURES 11 and 13) pressure ring. The first-mentioned design offers two main advantages. First, it is usually less costly production-wise. Secondly, if the gap between the rotating perforated disk 10b and the counter ring 11b is .3 mm. or more the rubber will extrude in comb form so that air will flow easily and unimpeded within the dryer even in case of heavy loads. Disadvantageous is the fact that in case of gaps below .1 mm. the vanes 23a which will deform resiliently under stress may hook with their edges into the counter ring 11b causing mechanical break-down. In case of the closed design only individual narrow rubber bands are obtained, their thickness depending greatly on the width of the slot. The advantage of this design is its greater stability. Due to the closed-off outer surface there is no danger that the edges will hook into any part.

The edges of the slots can be designed in various ways also. The two most significant shapes are illustrated in FIGURES 10 and 11 and FIGURES 12 and 13. The smooth design (FIGURES 10 and 11) is more simple production-wise but the rubber is then obtained in the form of flat bands.

Figure 12:
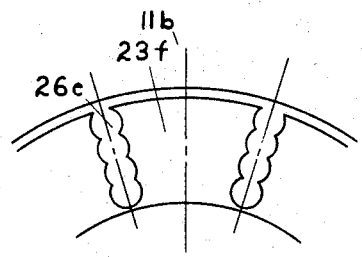
Figure 13:
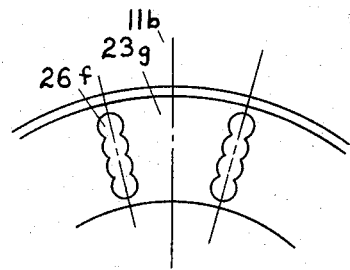

The design shown by FIGURES 12 and 13, which can be manufactured by several intersecting bores, is more expensive production-wise but will result in bands with split surfaces which will reduce the drying time. There is therefore a multitude of possible slot designs which can not be listed exhaustively.

Figure 14:
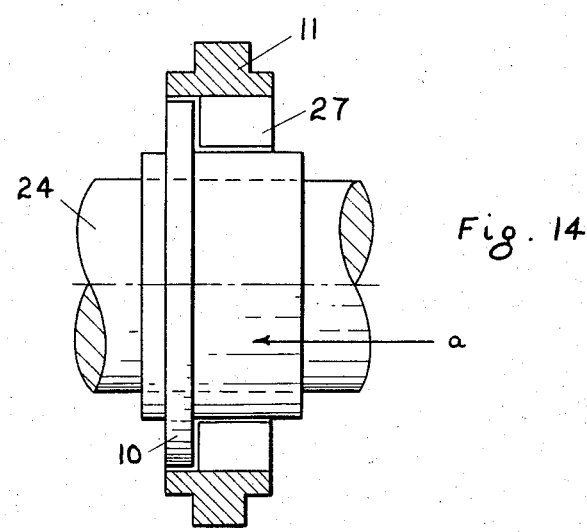
FIG. 14 is a longitudinal sectional view, partly in elevation of the discharge end of another form of worm press.

For the faultless operation of the process, that is to attain a satisfactory shaving operation by use of the above described devices, it is essential that the rubber flows co-axially to the perforated disk 10. Certain rubber species require substantial distances between the terminal worm gear and the perforated disk, possibly amounting to the double or triple diameter of the worm shaft, for the rubber to lose its peripheral velocity. However, the distance between the terminal worm gear and the perforated disk can be reduced to approximately one half of the diameter of the worm shaft and still very thin rubber bands be obtained if guiding devices 27 as shown by FIGURE 14 are arranged on the counter ring 11 between the worm and the perforated disk 10.

*Example*

Employed for the removal of water is a single-worm press of the model KP produced by the "Harburger Eisen—and Bronzewerke." The worm bushings have a constant outer diameter of 150 mm. throughout the entire length. The worm press has the following components, starting from the intake end:

1 feed worm, double-threaded, 200 mm. pitch, 200 mm. length, 100 mm. inside diameter.
1 pressure worm, single-threaded, 170 mm. pitch, 200 mm. length, 100 mm. inside diameter.
1 pressure worm, single-threaded, 115 mm. pitch, 115 mm. length, 107 mm. inside diameter.
2 pressure worms, single-threaded, 90 mm. pitch, 90 mm. length, 115 mm. inside diameter.
1 pressure worm, single-threaded, 56 mm. pitch, 56 mm. length, 115 mm. inside diameter.
1 pressure worm, single-threaded, 43 mm. pitch, 43 mm. length, 122 mm. inside diameter.

The differences in the inside diameters of the individual pressure worms are equalized by tapered intermediate rings of 30 mm. length each. The terminal pressure worm is followed by a cylindrical spacer of 106 mm. length which in turn is followed by the perforated disk which is fastened to the shaft. The perforated disk has a thickness of 12 mm., an outer diameter of 150 mm. and rotates within the counter ring with a play of .2 mm. Within the perforated disk there are arranged over a circle of 135 mm. diameter 44 holes with diameters of 8 mm. at an angle $\alpha=90°$ C. The pressure worms are surrounded by a three-sectional strainer frame with an inside diameter of 152 mm., the widths of its apertures narrowing, when viewed from the intake end, from .6 mm. over .45 mm. to .3 mm. The worm press is driven by an alternating current motor with a 15 kw. output, the shaft rotates at 24.8 r.p.m.

The material processed is 1,4-cis-polybutadiene, prepared by polymerization of 1,3-butadiene with Ziegler catalyzers, to a Mooney plasticity of $M_{L4}=50$. At a rate of flow of approximately 250 kg. per hour the required power of the motor is approximately 4.5 kw. and the residual moisture approximately 7%. The product extrudes from the bores of the perforated disk in the form of loose bands approximately 2 mm. thick and 16 mm. wide. The bands are cut into pieces of approximately 25 mm. length by the knives fastened to the counter ring. Upon leaving the bores the product drops directly into a triple-chambered single-band hot-air dryer and is dried therein at chamber temperatures of 100° C., 90° and 80° C., respectively—viewed in direction of product flow—within 45 minutes. Only the permissible residual humidity of less than .5% will remain. The total amount of rubber product discharged through the strainer of the last stage after a running time of 4 weeks is approximately 2.5 kg. Only a negligible amount of fine-grained material is found on the plate conveyor.

However, if the worm press is used for the processing of 1,4-cis-polybutadiene which is prepared under the above given specifications but mixed with 1.5% of a mixture of oleic acid and stearic acid, no measurable changes will occur in the operating conditions of the worm press and the band dryer with respect to power requirements, rate of product flow, extrusion of the product and drying temperatures but the product emerges from the worm press in finely crumbled form so that the band dryer must be shut down and cleaned after three weeks of operations.

If the bores are arranged at an angle of $\alpha=65°$ C., compact elliptical granulated products are obtained if pure polybutadiene is used. With the conditions of processing remaining constant concerning the worm press it becomes necessary to increase the temperatures in the dryer to 110°, 100° and 80° C. respectively to accomplish the drying of the product after a transit time of 45 minutes. If the initial product is mixed with oleic and stearic acids the extruding product will now cease to choke the band dryer due to its coarser structure.

If a perforated disk using an angle α=125° is employed the pure polybutadiene will require only 40 minutes of drying time. No changes are found in the operating conditions of the worm press.

Similar results are obtained by employing a perforated disk where its bores are designed in the form of radial slots with diverse profiles. The rubber so processed can have a variety of shapes from split comb-shaped bands to smooth and narrow rubber bands.

If a perforated disk of identical design is employed but is fastened to the housing, in other words a stationary disk, the power requirement will rise to 5.4 kw. at a product flow of 250 kg. per hour if the product is pure 1,4-cis-polybutadiene. The moisture content of the extruding product is again 7% at the beginning of the operation but will exceed 15% after three weeks of operations due to a completely plugged strainer, requiring the shutting down and cleaning of the apparatus. The drying temperatures in the band dryer are 110°, 100° and 80° C., respectively, for a drying time of 45 minutes. No significant accumulation of fine particles is found in the dryer.

If the perforated disk is replaced by a tapered, grooved head with a taper of approximately 15°, the power requirement will increase to 10.4 kw. with the rate of product flow remaining at 250 kg. per hour. The residual moisture is approximately 6.5% if the gap between the cones is 2.5 mm. The shredded product obtained in this manner, in size comparable with the palm of a hand, must be crushed to facilitate its drying. For this purpose a hammer grinder, requiring a power of 3.9 kw. is placed into the cycle of operations, and the temperatures of the dryer placed successively to the grinder are 100°, 90° and 80° C. respectively at a drying time of 45 minutes. The strainers of the worm press become plugged completely after 4 weeks of operations causing a sharp increase in the moisture content and cleaning of the apparatus becomes necessary. Likewise, the band dryer is plugged by finely powdered material and need to be cleaned also.

By employing the newly proposed process and the devices suitable for its practical application it becomes possible to work plastically and loosen synthetic rubber with low energy expenditure in such manner that it can be dried immediately by thermal means without prior use of a crushing device. The process permits substantial savings in energy and initial equipment.

We claim:
1. A worm press for plastic working and loosening of synthetic rubber comprising a worm secured to a rotatable central shaft, means for rotating said shaft, a stationary cylindrical screen surrounding said worm and spaced from said shaft, a stationary solid ring secured to the end of said screen adjacent to the discharge end of said worm, said ring being also spaced from said shaft, a perforated disk closing the space between said ring and said shaft and knives disposed adjacent the outer face of said disk for cutting rubber extruded through the openings in said disk relative movement between said disk and said knives, for cutting the material extruded through the apertures in said disk, being generated directly by movement of the worm drive shaft.

2. A worm press as defined in claim 1 in which the perforated disk is secured to said shaft and rotates therewith and said knives are carried by said ring.

3. A worm press as defined in claim 1 in which said perforated disk is secured to said ring and said knives are carried by said shaft and rotate therewith.

4. A worm press for plastic working and loosening of synthetic rubber comprising a worm secured to a rotatable central shaft, means for rotating said shaft, a stationary cylindrical screen surrounding said worm and spaced from said shaft, a stationary solid ring secured to the end of said screen adjacent to the discharge end of said worm, said ring being also spaced from said shaft, a perforated disk closing the space between said ring and said shaft, and knives movable relative to said disk for cutting rubber extruded through the openings in said disk, the discharge end of said worm being spaced longitudinally from said screen and radial vanes occupying the space between said shaft, said perforated disk, the end of said worm and the inner surfaces of said ring and screen.

5. A worm press as defined in claim 4 in which said vanes are mounted on and rotate with said shaft.

6. A worm press as defined in claim 4 in which said vanes are mounted on said ring.

7. A worm press as defined in claim 1 in which the bores in said perforated disk form an angle of from 20 to 160° with the longitudinal axis of said shaft, the diameter of said bores ranging from 1/5 to 1/50 of the diameter of said perforated disk.

8. A worm press as defined in claim 1 in which the bores in said perforated disk are narrow radial slots with a width of from .5 mm. to 15 mm. and a length of from 70 to 100% of the depth of the terminal worm.

9. A screw press as defined in claim 8 in which the profile of the slots in said perforated disk tapers inwardly in direction of the flow of products to a reduction of cross-sectional area of from 20 to 90%.

10. A screw press as defined in claim 8 in which the profile of the slots in said perforated disk tapers outwardly in direction of the flow of products to an increase of cross-sectional area of from 110 to 300%.

References Cited

UNITED STATES PATENTS

| | | |
|---|---|---|
| 2,401,236 | 5/1946 | Fielitz. |
| 2,547,151 | 3/1951 | Braeselse. |
| 2,620,172 | 12/1952 | Jenett et al. |
| 3,214,796 | 11/1965 | Ginaven _____ 146—188 X |
| 742,971 | 11/1903 | Cummer. |
| 1,604,662 | 10/1926 | Royle. |
| 2,059,486 | 11/1936 | Payne et al. |
| 2,276,261 | 3/1942 | Buzard _____ 25—14 |
| 2,322,791 | 6/1943 | De Back _____ 25—14 X |
| 2,333,786 | 11/1943 | Hessen. |
| 2,354,924 | 8/1944 | Meakin. |
| 2,441,222 | 5/1948 | Fuller _____ 25—14 X |
| 2,488,129 | 11/1949 | La Lande, Jr. _____ 25—14 |
| 2,648,262 | 8/1953 | Croston et al. |
| 2,779,054 | 1/1957 | Doriat et al. _____ 18—2 |
| 3,008,696 | 11/1961 | Oldershaw et al. |
| 3,009,202 | 11/1961 | Maccaferri _____ 18—12 X |

FOREIGN PATENTS 643,211   7/1962   Italy.

WILLIAM J. STEPHENSON, Primary Examiner.